Nov. 29, 1938.                A. GULLA                2,138,544
                        POULTRY FOUNTAIN CAGE
                         Filed Aug. 4, 1937
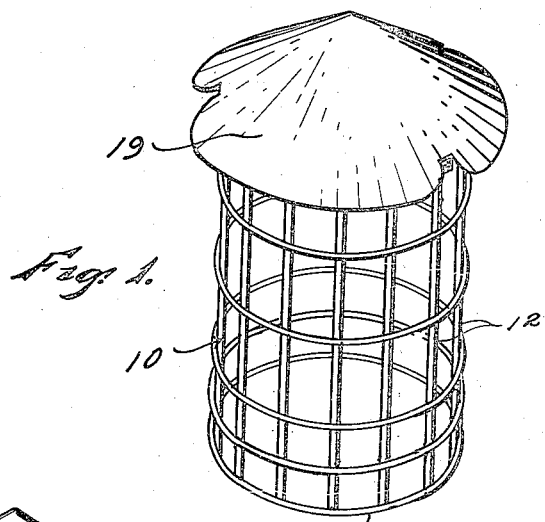
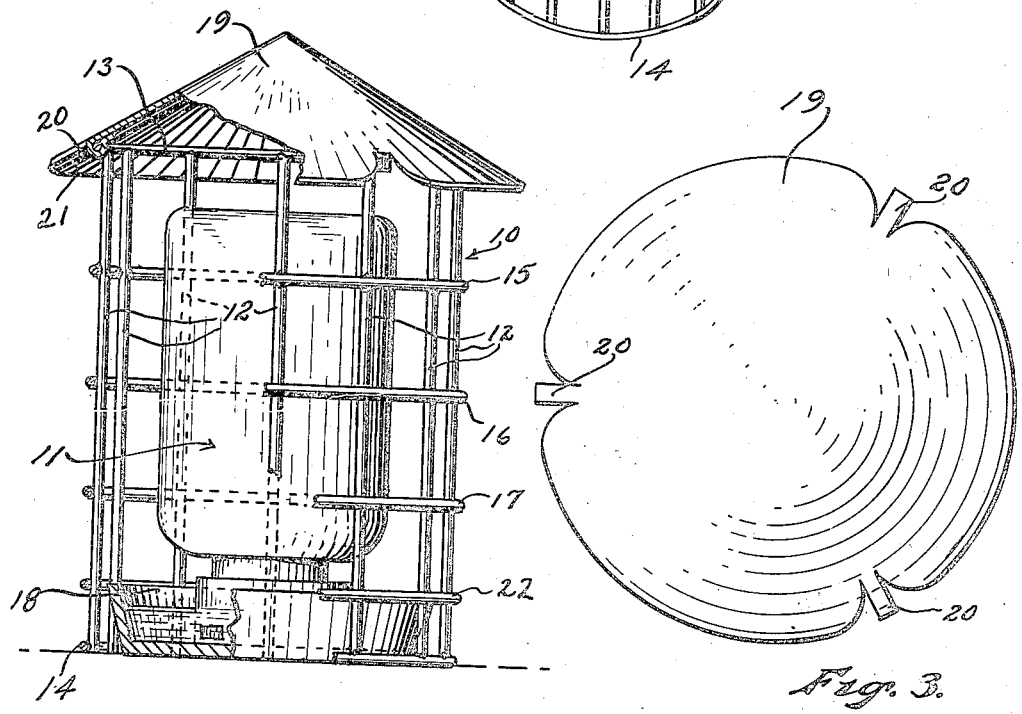
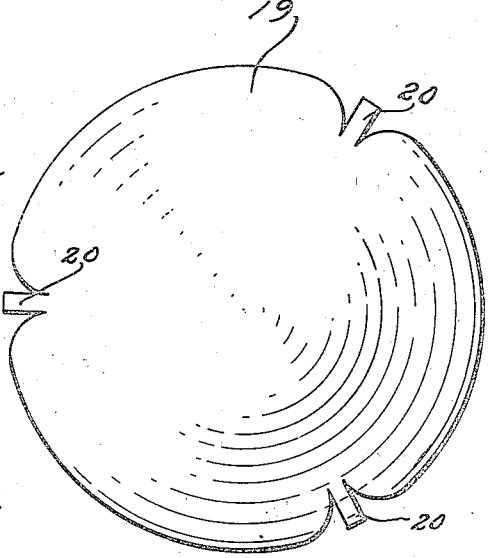
INVENTOR:
Alexander Gulla,
BY:
Christian K. Nielsen,
ATTORNEY Patented Nov. 29, 1938

2,138,544

UNITED STATES PATENT OFFICE 2,138,544

POULTRY FOUNTAIN CAGE

Alexander Gulla, Beaver, Pa.

Application August 4, 1937, Serial No. 157,401

1 Claim. (Cl. 119—51)

This invention relates to means for protecting poultry drinking fountains from contamination by the chicks and fowl, and it consists in the constructions, arrangements and combinations herein described and claimed.

In the past considerable loss of chicks and fowl has been experienced due to unclean or contaminated water, brought on by the fowl getting into the water, leaving droppings or otherwise making the water unfit for drinking purposes.

It is therefore an object of the invention to provide a cage structure which may be readily installed over a drinking fountain, vessel or container for the water of such character as to prevent the fowl from actually getting into the water, yet permitting access for drinking purposes.

It is also an object of the invention to provide a structure which may be manufactured at a low cost and effective for the purpose intended.

Additional objects, advantages and features of invention will be apparent from the following description considered in conjunction with the accompanying drawing, wherein—

Figure 1 is a perspective view of the cage.

Figure 2 is an elevational view of the device in use upon a conventional drinking fountain, parts being broken away.

Figure 3 is a plan view of the blank for top of the cage.

There is illustrated a cage-like structure 10, which may be of any desired height and of such circumference as to readily house or enclose a water fountain, vessel or container, generally indicated at 11.

The cage 10 consists of a plurality of vertical bars 12 which preferably are formed from light gauge metal and may have any desired shape. The bars 12 are spaced and secured at their upper and lower ends by respective ring members 13 and 14 and between these ring members a suitable number of ring members are provided, secured to the bars 12. In the present instance, four rings are shown, indicated at 15, 16, 17 and 22. The rings 15 and 16 may have any desired spacing, but the lower rings 17 and 22 should have a spacing such as will permit ready access of the heads and necks of fowl and chicks to the tray 18 of the fountain but such as to prevent bodily entrance of the fowl and chicks to the interior of the cage. The ring 22 will be spaced from the lower ring 14 such distance as to prevent chicks from gaining access therebetween, and in practice, has a spacing of about two inches.

The upper portion of the cage 10 is provided with a conical roof 19, formed from a single blank of metal, as may be seen in Figure 3. At suitable spaced points of the blank a series of tongues 20 are formed. The tongues 20 are provided by slitting the metal of the blank inwardly of its circumference a suitable distance. Thus, when the tongues 20 are bent inwardly and around the upper ring 13, as shown in Figure 2, an overhanging flange 21 is provided.

The conical roof prevents chicks and fowl from roosting thereon and the flange 21 insures against droppings of any foreign matter from above entering the tray 18.

While I have shown and described a preferred form of the invention, this is by way of illustration only, and I consider as my own all such modifications as fairly fall within the scope of the appended claim.

I claim:

A cage for poultry drinking fountains or the like comprising a wire structure of a size to house the fountain, consisting of a plurality of vertically spaced bars, a ring member fixed to the upper and lower ends of the bars, ring members fixed to the bars intermediate the upper and lower bars, one of the ring members being spaced only sufficient distance above the upper edge of a tray within the cage to admit the head of a fowl or chick therebetween, and a conical roof secured to the uppermost ring, said roof including circumferentially spaced tongues adapted to be bent around the uppermost ring.

ALEXANDER GULLA.